United States Patent [19]

Urakami

[11] 4,229,898
[45] Oct. 28, 1980

[54] FISHING ROD AND REEL MOUNTING HANDLE

[75] Inventor: Akio Urakami, Fuchu, Japan
[73] Assignee: Ryobi, Ltd., Fuchu, Japan
[21] Appl. No.: 4,788
[22] Filed: Jan. 19, 1979
[30] Foreign Application Priority Data
Jan. 31, 1978 [JP] Japan .................. 53-10899[U]
[51] Int. Cl.³ .................................. A01K 87/00
[52] U.S. Cl. ................................ 43/21.2; 43/23
[58] Field of Search ..................... 43/21.2, 22, 23
[56] References Cited
U.S. PATENT DOCUMENTS

| 931,277 | 8/1909 | Crane | 43/23 X |
|---|---|---|---|
| 2,498,648 | 2/1950 | Christen | 43/22 |
| 3,229,405 | 1/1966 | Veeder | 43/21.2 X |
| 4,020,581 | 5/1977 | Genouese | 43/22 |

Primary Examiner—Nicholas P. Godici
Attorney, Agent, or Firm—Sughrue, Rothwell, Mion, Zinn and Macpeak

[57] ABSTRACT

A fishing rod and reel mounting handle is disclosed, wherein a trigger is pivotally secured to a body of the handle. The trigger has a firsrt and a second position, at which the trigger is locked, respectively. The first position of the trigger is at the trigger extending position adapted to mount a spin cast reel on the handle, while the second position thereof is at the trigger retracted position adapted to mount a spinning reel on the handle for providing easy grip of the handle.

4 Claims, 4 Drawing Figures

FISHING ROD AND REEL MOUNTING HANDLE

BACKGROUND OF THE INVENTION

This invention relates to a fishing rod and reel mounting handle, and more particularly, to a type thereof which is commonly usable for mounting either a spin cast reel or a spinning reel with excellent grippability.

In a spin casting, generally, a bait casting reel or a closed face reel is used. A reel mounting portion is formed in curved or crank shape in order to realize easy handling of the reel. The reel mounting portion has an upper recessed portion in which a reel foot is received, and has a lower portion provided with a trigger integrally at the position approximately below the recessed portion. Such curved reel mounting portion and the trigger are effective for a fisherman in order to hold and support the fishing rod and fishing reel mounted on the handle by a single hand.

On the other hand, if a spinning reel is mounted on the reel mounting portion, since the spinning reel is normally hangingly supported by a reel mount, and the fisherman normally grips the handle at the position adjacent the reel in order to sustain central gravity of the combination of the rod, the spinning reel and the handle, the trigger may prevent the fisherman from effectively gripping the handle and supporting the weight. Therefore, the reel mounting handle used for mounting the spin cast reel would not be used in order to mount the spinning reel thereon, resulting in that the fisherman is obliged to prepare another type of reel mounting handle in order to mount the spinning reel with exhibiting sufficient grippability.

SUMMARY OF THE INVENTION

It is therefore, an object of this invention to provide a fishing rod and reel mounting handle usable for mounting a spinning reel as well as a spin cast reel with excellent grippability and operability.

The object according to this invention is attained by providing a means for pivoting a trigger pivotally secured to the handle, wherein the trigger is pivoted to downwardly extend from the handle in case of mounting the spin cast reel, while the trigger is housed in the handle in case of mounting the spinning reel. The two positions of the trigger are respectively locked by the surface engagement between positioning surfaces formed at the trigger end surface and a leaf spring having one end connected to the handle. These positioning surfaces are formed to have a suitable angle therebetween so as to allow pivotal movement of the trigger upon the trigger being subject to predetermined force. That is, one of the positioning surfaces is in surface engagement with the leaf spring at the first position to maintain trigger extending position, and the other of the positioning surface is in surface engagement with the leaf spring at the second position to maintain trigger retracted position, to thus realize suitable locking thereof.

The invention will be described with reference to the accompanying drawings and description of the preferred embodiment that follows.

DETAILED DESCRIPTION OF THE INVENTION

Figure 1:
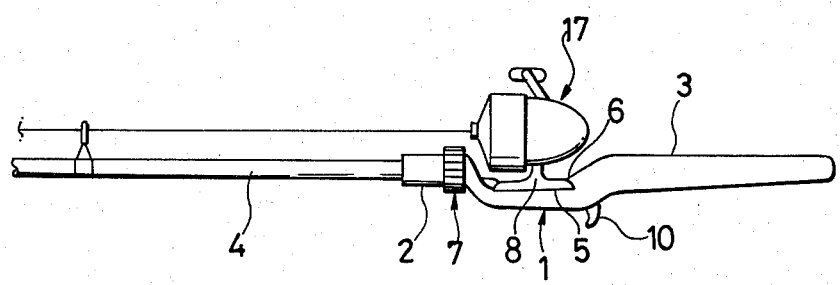
FIG. 1 is a schematic illustration of a fishing rod and reel mounting handle according to the present invention, in which a spin cast reel is mounted.

Referring to FIG. 1, a closed face reel 17 is mounted on a recessed portion 5 of a reel mounting handle body 1 formed in a substantially crank shape. Front end of a reel foot 8 is secured by a conventional reel fixing means 7 consisting of, for example, a screw and a clasp to fix the foot 8 by the threading movement of the screw. The rear end of the reel foot 8 is fixed by a hook 6 formed in the rear end of the recessed portion 5.

The front end of the body 1 is provided with a fishing rod holder 2 to which one end of a fishing rod 4 is fixed, while the rear portion of the body 1 is provided with a gripper portion 3. A trigger 10 mentioned later is downwardly extended from the lower portion of the body 1 to thereby provide excellent operability in case of the employment of the spin cast reel.

Figure 2:
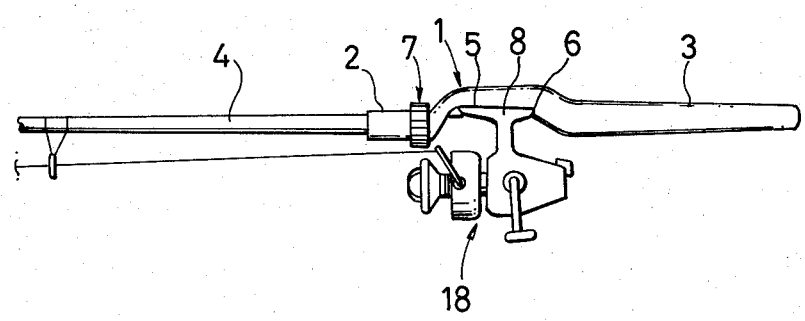
FIG. 2 is a schematic illustration of a fishing rod and reel mounting handle according to the present invention, in which a spinning reel is mounted.

In FIG. 2, like part and components are designated by the same reference numerals as those shown in FIG. 1, but a spinning reel 18 is hangingly mounted on the body 1 instead of the closed face reel 17, and the trigger 10 shown in FIG. 1 is housed in the body 1 of the handle.

Essential portions of this invention will be described with reference to FIGS. 3 and 4, wherein a recessed groove 9 is formed in the bottom portion of the body 1 at the position approximately below the recessed portion 5. The recessed groove 9 has a sufficient depth and longitudinal length so as to house the trigger 10 therein. The trigger 10 is pivotally secured to a pin 11 disposed in the recessed groove 9 and secured to a lower portion of the body 1.

Figure 3:
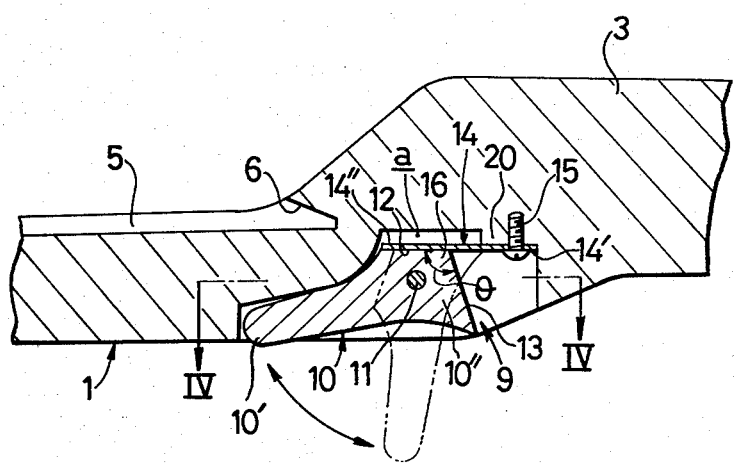
FIG. 3 is a partial cross-sectional view showing an essential part of the present invention.
Figure 4:
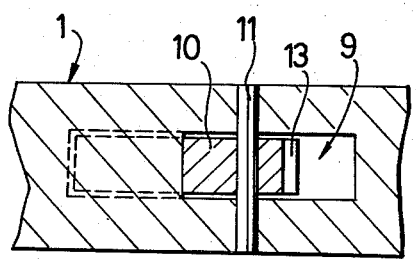
FIG. 4 is a cross-sectional illustration taken along the line IV—IV of FIG. 3.

As shown by a solid line in FIG. 3, one end of trigger surface 10' is substantially flush with the surface of the body 1, when the trigger is housed in the groove 9 to thus perform excellent fishing operation in case of the employment of the spinning reel. On the other hand, as shown by a chain line in FIG. 3, the trigger 10 has a sufficient longitudinal length to smoothly hook a finger thereon, to thus perform excellent fishing in case of the employment of the spin cast reel.

A leaf spring 14 is provided in the recessed groove 9 as as to perform surface engagement with positioning surfaces 12 or 13 formed in the other end portion 10'' of the trigger 10. The leaf spring 14 has one end 14' fixed to a stepped portion 20 in the recessed groove 9 by a bolt 15 and has the other end 14'' horizontally extending within the groove 9. The positioning surfaces 12 and 13 provide a suitable angle $\ominus$ therebetween, and therefore, when the fisherman forcibly rotates the trigger 10 from its position shown by the solid line in FIG. 3, the trigger is rotated about the pin 11, during which an apex portion having the angle $\ominus$ upwardly and slidingly urges the leaf spring 14, and then the trigger 10 is locked upon the other positioning surface being in surface engagement with the leaf spring 14 as shown by the chain line of FIG. 3. In order to effectively perform this operation, a clearance space a is provided in the groove 9 so as to allow upward deformation of the leaf spring 14 when the trigger 10 rotates about the pin 11. The resilient urging force of the leaf spring 14 can lock the trigger 10 at the predetermined first or second position, so that the free pivotal movement of the trigger is prevented, to thereby ensure excellent fishing in case of the employment of the spin cast reel as well as the spinning reel.

With this structure, the fishing rod and reel mounting handle according to this invention is employable for mounting spin cast reel by extending the trigger from the body and for mounting the spinning reel by housing the trigger thereinto, resulting in minimizing the numbers of handles.

While the invention has been described in detail and with reference to specific embodiment thereof, it will be apparent to one skilled in the art that various changes and modifications can be made therein without departing from the spirit and scope thereof.

What is claimed is:

1. In a fishing rod and reel mounting handle including a rod holder at the front end thereof, a gripping portion at the rear end thereof, and an intermediate portion having a recessed portion for mounting a reel thereon, and a means for fixing a reel foot to the recessed portion, the improvement comprising:

(a) a blind bore recess formed in said intermediate portion at a position approximately opposite to said recessed portion,
(b) a trigger pivotably secured in said blind bore recess,
(c) a locking means disposed in said blind bore recess for selectively locking said trigger at a trigger extended position and a trigger retracted position, said trigger having one end surface thereof adapted to be substantially flush with a surface of said intermediate portion in the trigger retracted position,
whereby said trigger may be positioned in said extended position when a spin cast reel is mounted within said recessed portion, and in said retracted position when a spinning reel is hangingly mounted from said recessed portion, the position of said trigger being independent of the type of reel mounted upon said reel mounting handle.

2. The device of claim 1, wherein said trigger has the other end formed with first and second planar positioning surfaces defining an apex therebetween.

3. The device of claim 2, wherein said locking means is a leaf spring, said first planar positioning surface being in surface engagement with said leaf spring at the trigger retracted position, and said second planar positioning surface being in surface engagement therewith at the trigger extending position.

4. The device of claim 3, wherein said blind bore is formed with a stepped portion to allow resilient deformation of the leaf spring when the apex urges the same during pivotal movement of the trigger.

* * * * *